US012676664B2

(12) United States Patent
Goto et al.

(10) Patent No.: US 12,676,664 B2
(45) Date of Patent: Jul. 7, 2026

(54) WIRELESS COMMUNICATION SYSTEM, RELAY APPARATUS AND WIRELESS COMMUNICATION METHOD

(71) Applicant: NTT, Inc., Tokyo (JP)

(72) Inventors: Daisuke Goto, Musashino (JP);
Kiyohiko Itokawa, Musashino (JP);
Yasuyoshi Kojima, Musashino (JP);
Fumihiro Yamashita, Musashino (JP);
Yosuke Fujino, Musashino (JP); Kento Yoshizawa, Musashino (JP);
Kazumitsu Sakamoto, Musashino (JP)

(73) Assignee: NTT, Inc., Tokyo (JP)

( * ) Notice: Subject to any disclaimer, the term of this patent is extended or adjusted under 35 U.S.C. 154(b) by 656 days.

(21) Appl. No.: 17/920,952

(22) PCT Filed: May 20, 2020

(86) PCT No.: PCT/JP2020/019996
§ 371 (c)(1),
(2) Date: Oct. 24, 2022

(87) PCT Pub. No.: WO2021/234872
PCT Pub. Date: Nov. 25, 2021

(65) Prior Publication Data
US 2023/0170984 A1      Jun. 1, 2023

(51) Int. Cl.
*H04B 7/185*          (2006.01)

(52) U.S. Cl.
CPC ..... *H04B 7/18513* (2013.01); *H04B 7/18519* (2013.01)

(58) Field of Classification Search
CPC ............ H04B 7/18513; H04B 7/18519; H04B 7/1851; H04B 7/18563; H04W 56/00
See application file for complete search history.

(56) References Cited

U.S. PATENT DOCUMENTS 5,991,279 A * 11/1999 Haugli ................... H04B 7/216
370/320
6,501,955 B1 * 12/2002 Durrant ................. G01S 5/0273
342/453

(Continued)

FOREIGN PATENT DOCUMENTS

CN         107636985 A      1/2018
KR     10-2017-0136594       12/2017

(Continued)

OTHER PUBLICATIONS

Pokorny Jiri et al: "Concept design and performance evaluation of UAV-based backhaul link with antenna steering", Journal of Communications and Networks, New York, NY, USA, IEEE, US, vol. 20, No. 5, Oct. 1, 2018 (Oct. 1, 2018), 473-483, XP011704741, ISSN: 1229-2370, DOI: 10.1109/JCN.2018.000072 [retrieved on Nov. 12, 2018].

(Continued)

*Primary Examiner* — Hoang-Chuong Q Vu
(74) *Attorney, Agent, or Firm* — Harness, Dickey & Pierce, P.L.C.

(57) ABSTRACT

A relay apparatus includes a reception unit, a storage unit, and a transmission unit. The reception unit receives data wirelessly transmitted by a first communication apparatus through a plurality of first antennas. The storage unit wirelessly transmits the data received by the reception unit to a second communication apparatus through a plurality of second antennas. The second communication apparatus includes a relay data reception unit. The relay data reception unit receives data wirelessly transmitted by the relay apparatus through a plurality of third antennas.

10 Claims, 6 Drawing Sheets

(56) References Cited

U.S. PATENT DOCUMENTS

| | | | | |
|---|---|---|---|---|
| 9,154,352 | B2 * | 10/2015 | Palanki | H04L 5/0023 |
| 10,419,106 | B1 | 9/2019 | Liu et al. | |
| 2007/0008916 | A1 * | 1/2007 | Haugli | H04B 7/2041 |
| | | | | 370/320 |
| 2008/0247351 | A1 * | 10/2008 | Dankberg | H04B 7/1858 |
| | | | | 370/316 |
| 2009/0286471 | A1 * | 11/2009 | Ma | H04B 7/2606 |
| | | | | 455/10 |
| 2011/0151772 | A1 * | 6/2011 | Kim | H04W 56/00 |
| | | | | 455/9 |
| 2011/0188586 | A1 * | 8/2011 | Bidigare | H04B 7/18513 |
| | | | | 455/13.1 |
| 2016/0344685 | A1 | 11/2016 | Maharaja | |
| 2017/0163452 | A1 * | 6/2017 | Breiling | H04W 88/04 |
| 2019/0109635 | A1 | 4/2019 | Buer et al. | |
| 2023/0140643 | A1 * | 5/2023 | Hancharik | H04B 7/18515 |
| | | | | 455/12.1 |

FOREIGN PATENT DOCUMENTS

| | | | |
|---|---|---|---|
| WO | WO-2016126888 | A1 | 8/2016 |
| WO | WO-2016/195813 | A2 | 12/2016 |

OTHER PUBLICATIONS

Skritek Paul et al: "Environmental Data-transmission Using Low Earth Orbit Satellites", Proc. 16th Int. Conf. Enviroinfo, Jan. 1, 2002 (Jan. 1, 2002), pp. 727-734, XP093091138, Retrieved from the Internet: URL:http://enviroinfo.eu/sites/default/files/pdfs/vol106/0727.pdf>.

Zhou Zhenyu et al: "Autonomous Power Line Inspection Based on Industrial Unmanned Aerial Vehicles: An Energy Efficiency Perspective", 2018 IEEE 87th Vehicular Technology Conference (VTC Spring), IEEE, Jun. 3, 2018 (Jun. 3, 2018), pp. 1-5, XP033377599, DOI: 10.1109/VTCSPRING.2018.8417772 [retrieved on Jul. 20, 2018].

Wei Feng et al., "UAV-aided MIMO communications for 5G Internet of Things", IEEE Internet of Things Journal, vol. 6, Issue 2, 2018, p. 1731-1740.

Daisuke Goto et al., "Capacity Evaluation of Low-earth Orbit Satellite-MIMO Systems", IEICE Transactions on Information and Systems B (Communications), Aug. 1, 2019, vol. J102-B, No. 8, pp. 614-623.

International Search Report (English and Japanese) of the ISA issued in PCT/JP2020/019996, mailed Oct. 27, 2020; ISA/JP.

* cited by examiner

WIRELESS COMMUNICATION SYSTEM, RELAY APPARATUS AND WIRELESS COMMUNICATION METHOD

CROSS-REFERENCE TO RELATED APPLICATIONS

This application is a 371 U.S. National Phase of International Application No. PCT/JP2020/019996, filed on May 20, 2020. The entire disclosure of the above application is incorporated herein by reference.

TECHNICAL FIELD

The present invention relates to a wireless communication system, a relay apparatus and a wireless communication method.

BACKGROUND ART

With the development of Internet of Things (IoT) technology, installation of IoT terminals equipped with various sensors in various places is under discussion. For example, it is also conceived that the IoT will be used to collect data on places where it is difficult to install base stations, such as buoys and ships on the sea, mountainous areas, and the like. On the other hand, there is a technology for wireless communication with a terrestrial communication apparatus using an unmanned aerial vehicle (UAV) or a geostationary satellite (refer to NPL 1, for example).

CITATION LIST

Non Patent Literature

[NPL 1] Wei Feng, et al., "UAV-aided MIMO communications for 5G Internet of Things", IEEE Internet of Things Journal, Volume 6, Issue 2, 2018, pp. 1731-1740

SUMMARY OF THE INVENTION

Technical Problem

In NPL 1, a terminal using a UAV collects data from IoT terminals, but transmission of the collected data to a terrestrial communication apparatus is not mentioned.

In view of such circumstances, an object of the present invention is to provide a wireless communication system, a relay apparatus and a wireless communication method which can relay data transmitted by a communication apparatus to another communication apparatus through a mobile relay apparatus.

Means for Solving the Problem

One aspect of the present invention is a wireless communication system including a first communication apparatus, a second communication apparatus and a mobile relay apparatus, wherein the relay apparatus includes a reception unit that receives data wirelessly transmitted by the first communication apparatus through a plurality of first antennas, and a transmission unit that wirelessly transmits the data received by the reception unit to the second communication apparatus through a plurality of second antennas, and the second communication apparatus includes a relay data reception unit that receives the data wirelessly transmitted by the relay apparatus through a plurality of third antennas.

One aspect of the present invention is a relay apparatus in a wireless communication system including a first communication apparatus, a second communication apparatus, and the mobile relay apparatus, the relay apparatus including: a reception unit that receives data wirelessly transmitted by the first communication apparatus through a plurality of first antennas; and a transmission unit that wirelessly transmits the data received by the reception unit to the second communication apparatus, which receives the data using a plurality of third antennas, through a plurality of second antennas.

One aspect of the present invention is a wireless communication method executed by a wireless communication system including a first communication apparatus, a second communication apparatus, and a mobile relay apparatus, the wireless communication method including: a reception step of receiving, by the relay apparatus, data wirelessly transmitted by the first communication apparatus through a plurality of first antennas; a transmission step of wirelessly transmitting, by the relay apparatus, the data received in the reception step to the second communication apparatus through a plurality of second antennas; and a relay data reception step of receiving, by the second communication apparatus, the data wirelessly transmitted in the transmission step through a plurality of third antennas.

One aspect of the present invention is a wireless communication method executed by a relay apparatus in a wireless communication system including a first communication apparatus, a second communication apparatus, and a mobile relay apparatus, the wireless communication method including: a reception step of receiving data wirelessly transmitted by the first communication apparatus through a plurality of first antennas; and a transmission step of wirelessly transmitting the data received in the reception step to the second communication apparatus, which receives the data using a plurality of third antennas, through a plurality of second antennas.

Effects of the Invention

According to the present invention, it is possible to relay data transmitted by a communication apparatus to another communication apparatus through a mobile relay apparatus.

DESCRIPTION OF EMBODIMENTS

Hereinafter, embodiments of the present invention will be described in detail with reference to the drawings.

First Embodiment

Figure 1:
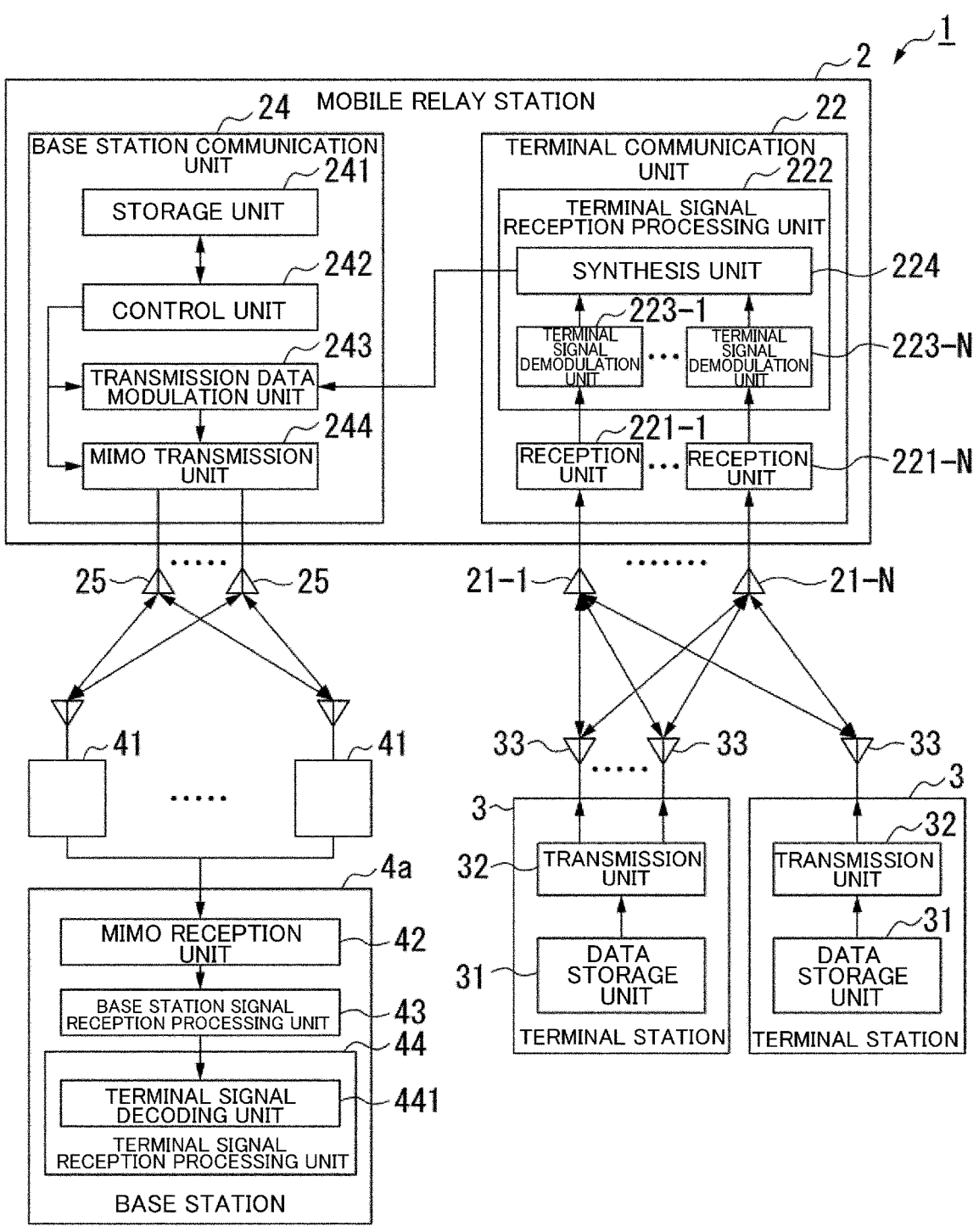
FIG. 1 is a configuration diagram of a wireless communication system according to a first embodiment of the present invention.

FIG. 1 is a configuration diagram of a wireless communication system 1 according to a first embodiment. The wireless communication system 1 includes a mobile relay station 2, a terminal station 3, and a base station 4. The number of each of the mobile relay stations 2, the terminal stations 3, and the base stations 4 included in the wireless communication system 1 is arbitrary, but it is assumed that there are a large number of terminal stations 3.

The mobile relay station 2 is an example of a relay apparatus mounted on a moving body, and an area in which the mobile relay station 2 can perform communication moves with the passage of time. The mobile relay station 2 is provided in, for example, a low Earth orbit (LEO) satellite. The altitude of the LEO satellite is 2000 km or less, and the LEO satellite orbits over the Earth in about 1.5 hours. The terminal station 3 and the base station 4 are installed on the Earth such as on the ground or the sea. The terminal station 3 is, for example, an IoT terminal. The terminal station 3 collects data such as environmental data detected by a sensor and wirelessly transmits the data to the mobile relay station 2. In the figure, only two terminal stations 3 are shown. The mobile relay station 2 receives data transmitted from each of the plurality of terminal stations 3 through wireless signals and wirelessly transmits the received data to the base station 4 while moving over the Earth. The base station 4 receives the data collected by the terminal station 3 from the mobile relay station 2.

It is conceivable to use a relay apparatus mounted on an unmanned aerial vehicle such as a geostationary satellite, a drone or a high altitude platform station (HAPS) as a mobile relay station. However, in the case of a relay station mounted on a geostationary satellite, the coverage area (footprint) on the ground is wide, but a link budget for IoT terminals installed on the ground is considerably small due to a high altitude. On the other hand, in the case of a relay station mounted on a drone or a HAPS, the link budget is high, but the coverage area is narrow. Furthermore, drones require batteries and HAPSs require solar panels. In the present embodiment, the mobile relay station 2 is mounted on a LEO satellite. Therefore, in addition to keeping the link budget within a limit, the LEO satellite has no air resistance and consumes less fuel because it orbits outside the atmosphere. In addition, the footprint is also large as compared to the case where a relay station is mounted on a drone or a HAPS.

However, since the mobile relay station 2 mounted on the LEO performs communication while moving at a high speed, a Doppler shift occurs in the wireless signals. Further, a relay station mounted on LEO has a smaller link budget than a relay station mounted on a drone or a HAPS. Therefore, the mobile relay station 2 receives a wireless signal from the terminal station 3 through a plurality of antennas and transmits the wireless signal to the base station 4 through a plurality of other antennas. Communication quality can be improved by the diversity effect and beamforming effect of communication using a plurality of antennas. In the present embodiment, an example of a case where the mobile relay station 2 relays a wireless signal received from the terminal station 3 through a plurality of antennas to the base station 4 according to Multiple Input Multiple Output (MIMO) will be described.

The configuration of each apparatus will be described.

The mobile relay station 2 includes N antennas 21 (N is an integer equal to or greater than 2), a terminal communication unit 22, a base station communication unit 24, and a plurality of antennas 25. The N antennas 21 are described as antennas 21-1 to 21-N.

The terminal communication unit 22 includes N reception units 221 and a terminal signal reception processing unit 222. The N reception units 221 are described as reception units 221-1 to 221-N. A reception unit 221-$n$ (n is an integer equal to or greater than 1 and equal to or less than N) receives a terminal uplink signal through an antenna 21-$n$.

The terminal signal reception processing unit 222 performs processing of receiving a terminal uplink signal. The terminal signal reception processing unit 222 includes N terminal signal demodulation units 223 and a synthesis unit 224. The N terminal signal demodulation units 223 are described as terminal signal demodulation units 223-1 to 223-N. A terminal signal demodulation unit 223-$n$ (n is an integer equal to or greater than 1 and equal to or less than N) demodulates a terminal uplink signal received by the reception unit 221-$n$ and outputs the demodulation result to the synthesis unit 224. The synthesis unit 224 outputs demodulation information obtained by synthesizing demodulation results input from the terminal signal demodulation units 223-1 to 223-N to the base station communication unit 24.

The base station communication unit 24 relays a terminal uplink signal to the base station 4 according to MIMO. The base station communication unit 24 includes a storage unit 241, a control unit 242, a transmission data modulation unit 243, and a MIMO transmission unit 244. The storage unit 241 stores in advance a weight for each transmission time of a base station downlink signal transmitted from each antenna 25. The transmission time may be represented by, for example, the elapsed time from a transmission start timing. The weight for each transmission time is calculated on the basis of orbit information of the LEO satellite and the position of each antenna station 41. The LEO orbit information is information by which the position, speed, moving direction, and the like of the LEO satellite at an arbitrary time can be obtained. A constant weight may be used regardless of the transmission time.

The control unit 242 indicates a weight for each transmission time, read from the storage unit 241, to the MIMO transmission unit 244. The transmission data modulation unit 243 receives the demodulation information output from the synthesis unit 224 as input transmission data, converts the input transmission data into parallel signals, and then modulates the parallel signals. The MIMO transmission unit 244 weights the each of the modulated parallel signals by the weight indicated by the control unit 242 to generate a base station downlink signal to be transmitted through each of the antennas 25. The MIMO transmission unit 244 transmits the generated base station downlink signals through the antennas 25 according to MIMO.

The terminal station 3 includes a data storage unit 31, a transmission unit 32, and one or a plurality of antennas 33. The data storage unit 31 stores sensor data and the like. The transmission unit 32 reads sensor data from the data storage unit 31 as terminal transmission data and wirelessly transmits a terminal uplink signal in which the read terminal transmission data has been set through the antennas 33. The transmission unit 32 transmits a signal according to, for example, Low Power Wide Area (LPWA). Although the LPWA includes LoRaWAN (registered trademark), Sigfox (registered trademark), Long Term Evolution for Machines (LTE-M), Narrow Band (NB)-IoT, and the like, any wireless communication method can be used. Further, the transmission unit 32, as well as other terminal stations 3, may perform transmission according to time division multiplexing, Orthogonal Frequency Division Multiplexing (OFDM), MIMO, or the like. The transmission unit 32 determines a channel and a transmission timing to be used by the host station to transmit a terminal uplink signal according to a method predetermined in a wireless communication method to be used. Further, the transmitting unit may form a beam of signals transmitted through the plurality of antennas 33 according to a method predetermined in a wireless communication method to be used.

The base station 4 includes a plurality of antenna stations 41, a MIMO reception unit 42, a base station signal reception processing unit 43, and a terminal signal reception processing unit 44.

The antenna stations 41 are arranged at a position away from other antenna stations 41 such that differences in arrival angles of the signals from the plurality of antennas 25 of the mobile relay station 2 increase. Each antenna station 41 converts base station downlink signals received from the mobile relay station 2 into an electronic signal and outputs the electronic signal to the MIMO reception unit 42.

The MIMO reception unit 42 aggregates base station downlink signals received from the plurality of antenna stations 41. The MIMO reception unit 42 stores a weight for each reception time for a base station downlink signal received through each antenna station 41 on the basis of the orbit information of the LEO satellite and the position of each antenna station 41. For example, the reception time may be represented by the elapsed time from a reception start timing. The MIMO reception unit 42 multiplies the base station downlink signal input from each antenna station 41 by the weight corresponding to the reception time of the base station downlink signal and synthesizes received signals multiplied by weights. The same weight may be used regardless of the reception time. The base station signal reception processing unit 43 demodulates and decodes the synthesized received signal to obtain demodulation information. The base station signal reception processing unit 43 outputs the demodulation information to the terminal signal reception processing unit 44.

The terminal signal reception processing unit 44 performs processing of receiving a terminal uplink signal. The terminal signal reception processing unit 44 includes a terminal signal decoding unit 441. The terminal signal decoding unit 441 decodes symbols of the terminal uplink signal indicated by the demodulation information to obtain terminal transmission data transmitted from the terminal station 3.

The operation of the wireless communication system 1 will be described.

Figure 2:
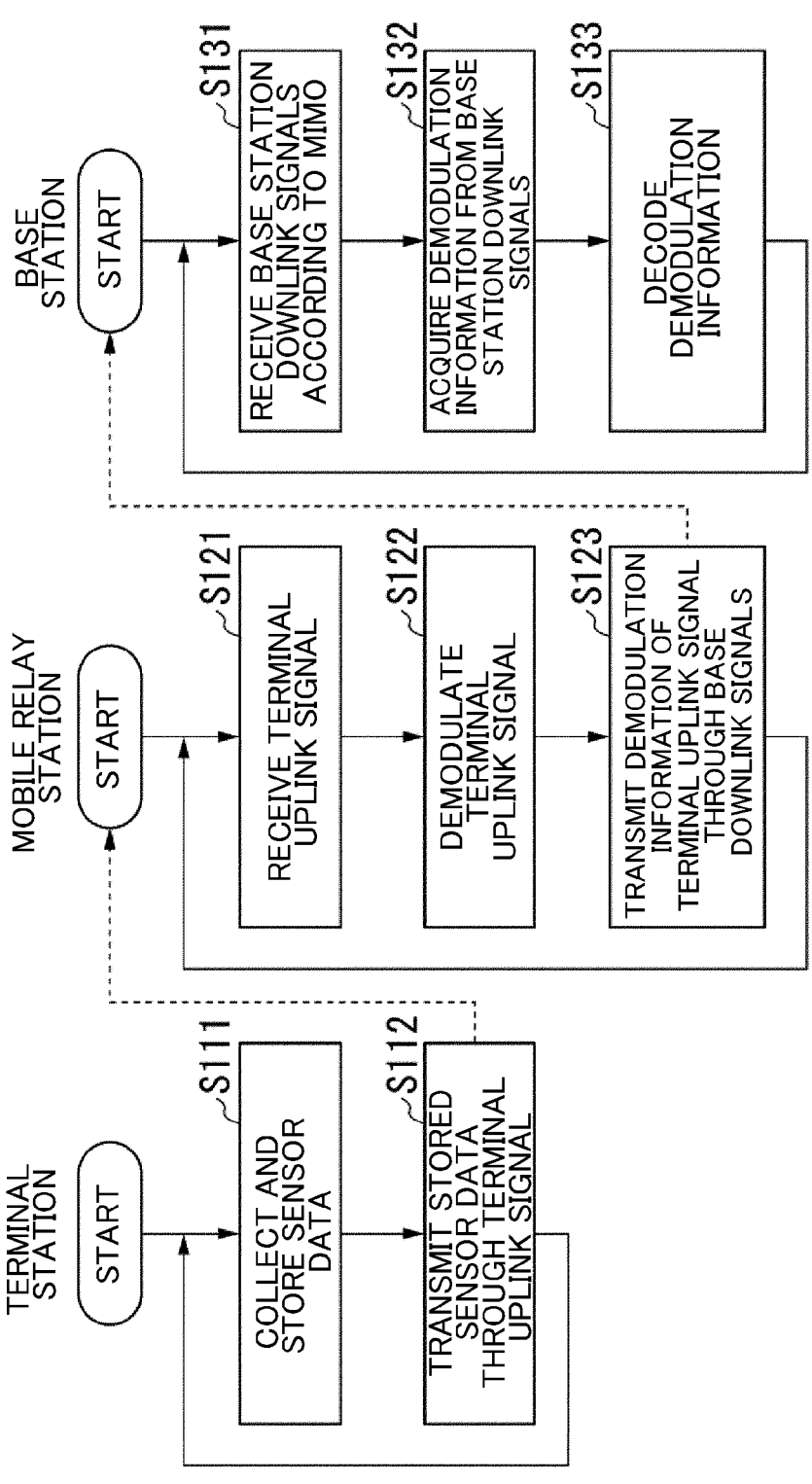
FIG. 2 is a flowchart showing processing of the wireless communication system according to the same embodiment.

FIG. 2 is a flow chart showing processing of the wireless communication system 1. The terminal station 3 acquires data detected by a sensor which is not illustrated and is provided externally or internally at any time and writes the acquired data in the data storage unit 31 (step S111). The transmission unit 32 reads the sensor data from the data storage unit 31 as terminal transmission data. The transmission unit 32 wirelessly transmits a terminal uplink signal in which the terminal transmission data has been set through the antennas 33 at a transmission start timing obtained in advance on the basis of the orbit information of the LEO satellite equipped with the mobile relay station 2 (step S112). The terminal station 3 repeats processing from step S111.

The reception units 221-1 to 221-N of the mobile relay station 2 receive the terminal uplink signal transmitted from the terminal station 3 (step S121). Depending on the wireless communication method of the terminal station 3 that is a transmission source, there are cases where a terminal uplink signal is received from only one terminal station 3 on a time division basis for the same frequency and cases where terminal uplink signals are simultaneously received from a plurality of terminal stations 3 at the same frequency. The terminal signal reception processing unit 222 demodulates the terminal uplink signal received in step S121 (step S122). Specifically, the terminal signal demodulation unit 223-$n$ identifies a wireless communication method on the basis of information specific to the wireless communication method included in the terminal uplink signal received by the reception unit 221-$n$. The reception units 221-1 to 221-N demodulate the terminal uplink signal according to the identified wireless communication method and output demodulation results to the synthesis unit 224. The synthesis unit 224 outputs demodulation information obtained by additively synthesizing the demodulation results input from the terminal signal demodulation units 223-1 to 223-N to the transmission data modulation unit 243.

According to this additive synthesis, the influence of randomly added noise is reduced although signals transmitted by the terminal station 3 are emphasized because they are correlated. Therefore, the diversity effect can be obtained with respect to terminal uplink signals simultaneously received by the mobile relay station 2 from only one terminal station 3. Further, the operation corresponds to MIMO communication performed for terminal uplink signals simultaneously received by the mobile relay station 2 from a plurality of terminal stations 3.

The transmission data modulation unit 243 receives the demodulation information from the synthesis unit 224 as transmission data. The transmission data modulation unit 243 performs parallel conversion on the transmission data and then modulates it. The MIMO transmission unit 244 weights the transmission data modulated by the transmission data modulation unit 243 by a weight indicated by the control unit 242 to generate a base station downlink signal to be transmitted through each antenna 25. The MIMO transmission unit 244 transmits each generated base station downlink signal through each antenna 25 according to MIMO (step S123). The mobile relay station 2 repeats processing from step S121.

Each antenna station 41 of the base station 4 receives the base station downlink signals from the mobile relay station 2 (step S131). Each antenna station 41 outputs a received signal obtained by converting the received base station downlink signals into an electronic signal to the MIMO reception unit 42. The MIMO reception unit 42 synchronizes timings of received signals received from the respective antenna stations 41. The MIMO reception unit 42 multiplies the received signals received by the respective antenna stations 41 by a weight and adds up the results. The base station signal reception processing unit 43 demodulates the added received signal (step S132). The base station signal reception processing unit 43 outputs demodulation information obtained by decoding the demodulated received signal to the terminal signal reception processing unit 44.

The terminal signal decoding unit 441 of the terminal signal reception processing unit 44 decodes symbols of the terminal uplink signal indicated by the demodulation information to obtain terminal transmission data transmitted from the terminal station 3 (step S133). The terminal signal decoding unit 441 can also use a decoding method having a large calculation load, such as successive interference cancellation (SIC). The base station 4 repeats processing from step S131.

According to the present embodiment, the mobile relay station receives a terminal uplink signal of a terminal station according to diversity reception, MIMO reception, or the like. Therefore, the mobile relay station can improve the link budget with respect to the terminal station. In addition, the mobile relay station transmits the terminal uplink signal to the base station according to MIMO. Therefore, the mobile relay station can collectively transmit terminal uplink signals received from a large number of terminal stations to the base station with a large capacity and high quality.

Second Embodiment

In the present embodiment, the mobile relay station accumulates waveform data of terminal uplink signals and wirelessly transmits a base station downlink signal in which the accumulated waveform data has been set to a base station. The present embodiment will be described focusing on differences from the first embodiment.

Figure 3:
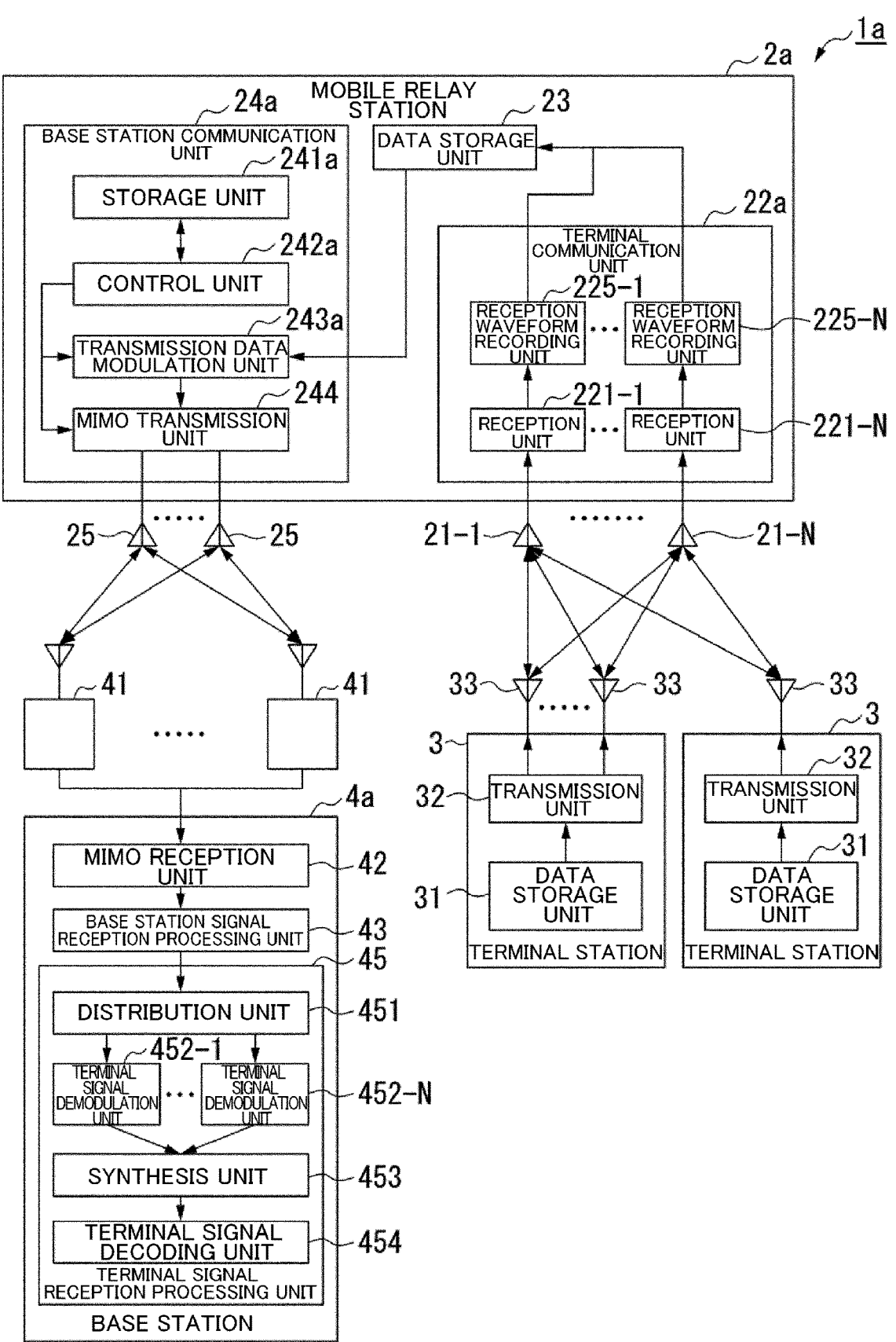
FIG. 3 is a configuration diagram of a wireless communication system according to a second embodiment.

FIG. 3 is a configuration diagram of a wireless communication system 1a according to a second embodiment. In the figure, the same components as those of the wireless communication system 1 in the first embodiment shown in FIG. 1 are designated by the same reference numerals and the description thereof will be omitted. The wireless communication system 1a includes a mobile relay station 2a, a terminal station 3, and a base station 4a.

The mobile relay station 2a mounted on a LEO satellite performs communication while moving at a high speed. Specifically, when viewed on the ground, the mobile relay station 2a passes over the sky in about 10 minutes. Therefore, the time for which each terminal station 3 or base station 4a can communicate with the mobile relay station 2 with high quality is limited, and the time may differ between the terminal station 3 and the base station 4a. In addition, the terminal station 3 uses wireless communication methods having various specifications. Therefore, the mobile relay station 2a of the present embodiment receives a terminal uplink signal from the terminal station 3 within a coverage at the current position during movement and stores waveform data of the received terminal uplink signal. The mobile relay station 2a wirelessly transmits base station downlink signals in which the waveform data of the terminal uplink signal has been set to the base station 4a at a timing when the base station 4a is present in the coverage. The base station 4a demodulates the base station downlink signals received from the mobile relay station 2a to obtain the waveform data of the terminal uplink signal. The base station 4a obtains terminal transmission data which is data transmitted by the terminal station 3 by demodulating and decoding the terminal uplink signal represented by the waveform data.

The configuration of each apparatus will be described.

The mobile relay station 2a includes N antennas 21 (N is an integer equal to or greater than 2), a terminal communication unit 22a, a data storage unit 23, a base station communication unit 24a, and a plurality of antennas 25. The terminal communication unit 22a includes N reception units 221 and N reception waveform recording units 225. The N reception waveform recording units 225 are described as reception waveform recording units 225-1 to 225-N. A reception waveform recording unit 225-n (n is an integer equal to or greater than 1 and equal to or less than N) samples a reception waveform of a terminal uplink signal received by a reception unit 221-n and generates waveform data representing values obtained by sampling. The reception waveform recording unit 225-n writes reception waveform information in which an antenna identifier of an antenna 21-n, the reception time of the terminal uplink signal in the antenna 21-n, and the generated waveform data have been set in the data storage unit 23. The antenna identifier is information that identifies the antenna 21-n. The data storage unit 23 stores reception waveform information including the waveform data of the terminal uplink signal received by each of the antennas 21-1 to 21-N.

The base station communication unit 24a includes a storage unit 241a, a control unit 242a, a transmission data modulation unit 243a, and a MIMO transmission unit 244. The storage unit 241a stores a transmission start timing calculated in advance on the basis of the orbit information of the LEO satellite equipped with the mobile relay station 2a and the position of the base station 4. Further, the storage unit 241a stores in advance a weight for each transmission time of a base station downlink signal transmitted through each antenna 25. A constant weight may be used regardless of the transmission time.

The control unit 242a controls the transmission data modulation unit 243a and the MIMO transmission unit 244 such that they transmit reception waveform information to the base station 4a at the transmission start timing stored in the storage unit 241a. Further, the control unit 242a indicates the weights for each transmission time read from the storage unit 241a to the MIMO transmission unit 244. The transmission data modulation unit 243a reads the reception waveform information from the data storage unit 23 as transmission data, converts the read transmission data into parallel signals, and then modulates the parallel signals. The transmission data modulation unit 243a outputs the modulated transmission data to the MIMO transmission unit 244.

The base station 4a includes a plurality of antenna stations 41, a MIMO reception unit 42, a base station signal reception processing unit 43, and a terminal signal reception processing unit 45. The terminal signal reception processing unit 45 receives reception waveform information decoded by the base station signal reception processing unit 43 and performs processing of receiving a terminal uplink signal indicated by the reception waveform information. Here, the terminal signal reception processing unit 45 performs processing of receiving according to the wireless communication method used for transmission by the terminal station 3 to acquire terminal transmission data. The terminal signal reception processing unit 45 includes a distribution unit 451, N terminal signal demodulation units 452, a synthesis unit 453, and a terminal signal decoding unit 454. The N terminal signal demodulation units 452 are described as terminal signal demodulation units 452-1 to 452-N.

The distribution unit 451 reads waveform data having the same reception time from reception waveform information and outputs the read waveform data to the terminal signal demodulation units 452-1 to 452-N according to antenna identifiers associated with the waveform data. That is, the distribution unit 451 outputs waveform data associated with the antenna identifier of the antenna 21-n to the terminal signal demodulation unit 452-n. Each of the terminal signal demodulation units 452-1 to 452-N demodulates waveform data and outputs symbols obtained by demodulation to the synthesis unit 453. The terminal signal demodulation unit 452-n may perform processing of compensating for a Doppler shift in a terminal uplink signal received by the antenna 21-n of the mobile relay station 2 with respect to the signal indicated by the waveform data, and then demodulate the signal. The Doppler shift applied to the terminal uplink signal received by each antenna 21-*n* is calculated in advance on the basis of the position of the terminal station 3 and the orbit information of the LEO equipped with the mobile relay station 2*a*. The synthesis unit 453 additively synthesizes symbols input from each of the terminal signal demodulation units 452-1 to 452-N and outputs the result to the terminal signal decoding unit 454. The terminal signal decoding unit 454 decodes the additively synthesized symbols to obtain terminal transmission data transmitted from the terminal station 3.

The operation of the wireless communication system 1*a* will be described.

Figure 4:
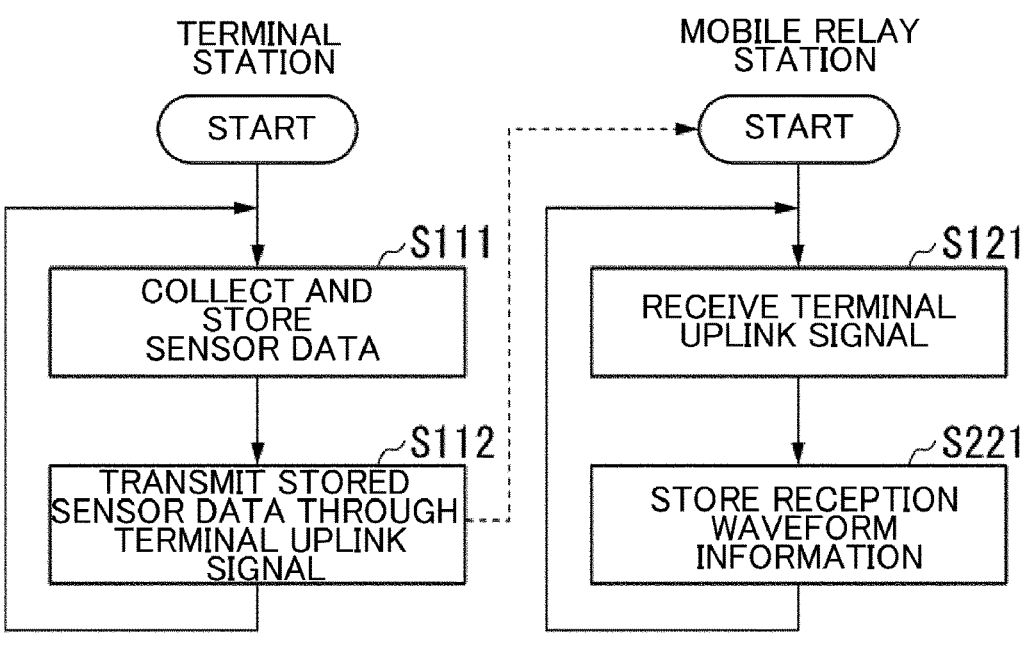
FIG. 4 is a flowchart showing processing of the wireless communication system according to the same embodiment.

FIG. 4 is a flow chart showing processing of the wireless communication system 1*a* when an uplink signal is transmitted from the terminal station 3. In the figure, the same processing as the processing flow of the first embodiment shown in FIG. 2 is designated by the same reference numeral. The terminal station 3 performs the same processing as processing of steps S111 and S112 in the processing flow of the first embodiment shown in FIG. 2.

The reception units 221-1 to 221-N of the mobile relay station 2*a* receive a terminal uplink signal transmitted from the terminal station 3 (step S121). The reception waveform recording unit 225-*n* writes reception waveform information in which waveform data representing the waveform of a terminal uplink signal received by the reception unit 221-*n*, the reception time, and the antenna identifier of the antenna 21-*n* are associated in the data storage unit 23 (step S221). The mobile relay station 2*a* repeats processing from step S121.

Figure 5:
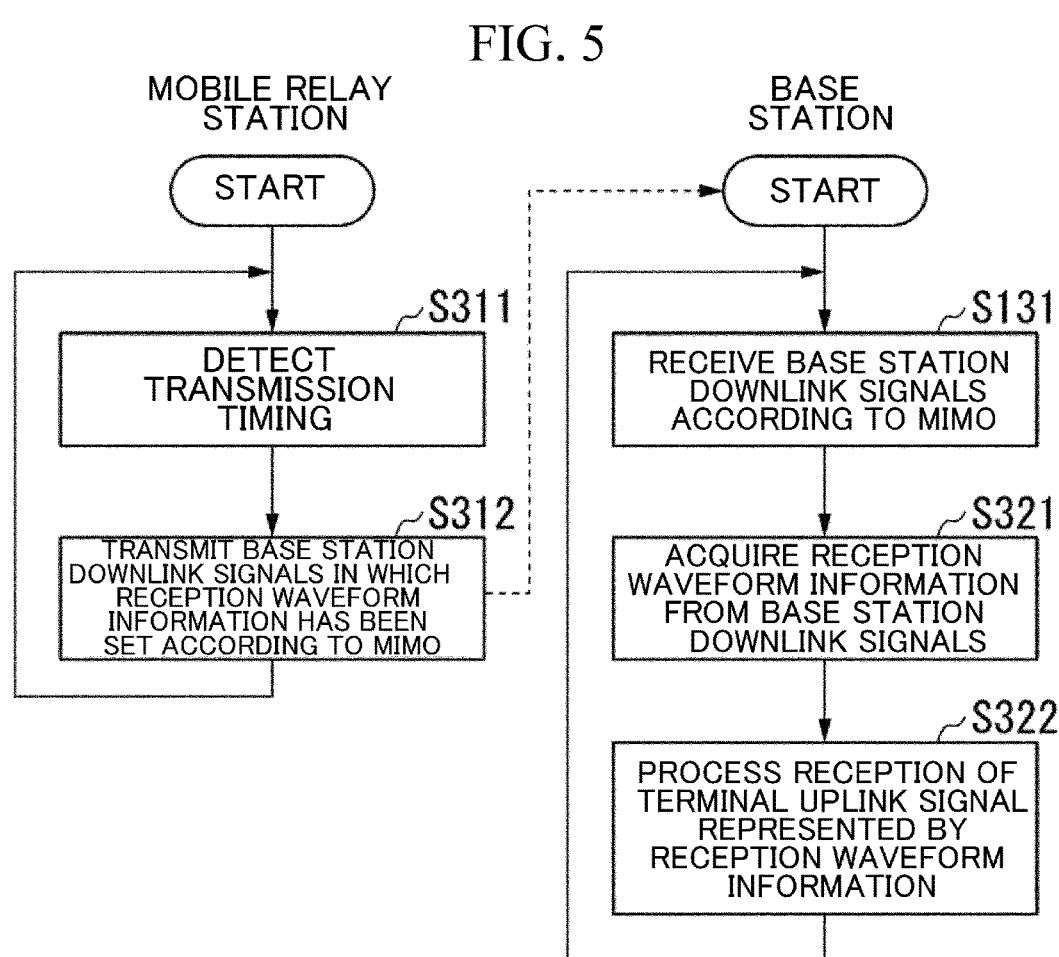
FIG. 5 is a flowchart showing processing of the wireless communication system according to the same embodiment.

FIG. 5 is a flow chart showing processing of the wireless communication system 1*a* when a base station downlink signal is transmitted from the mobile relay station 2*a*. In FIG. 5, the same processing as processing shown in the flowchart of the first embodiment shown in FIG. 2 is designated by the same reference numeral.

When the control unit 242*a* included in the base station communication unit 24*a* of the mobile relay station 2*a* detects arrival of a transmission start timing stored in the storage unit 241*a*, the control unit 242*a* instructs the transmission data modulation unit 243*a* and the MIMO transmission unit 244 to transmit reception waveform information (step S311). The transmission data modulation unit 243*a* reads the reception waveform information stored in the data storage unit 23 as transmission data, performs parallel conversion of the read transmission data, and then modulates it. The MIMO transmission unit 244 weights the transmission data modulated by the transmission data modulation unit 243*a* by a weight indicated by the control unit 242*a* to generate a base station downlink signal to be transmitted through each antenna 25. The MIMO transmission unit 244 transmits each generated base station downlink signal through each antenna 25 according to MIMO (step S312). The mobile relay station 2 repeats processing from step S311.

As in the first embodiment shown in FIG. 2, the base station 4*a* receives the base station downlink signals from the mobile relay station 2*a* according to MIMO (step S131). That is, each antenna station 41 outputs a received signal obtained by converting the base station downlink signals received from the mobile relay station 2*a* into an electronic signal to the MIMO reception unit 42. The MIMO reception unit 42 synchronizes timings of received signals received from the respective antenna stations 41. The MIMO reception unit 42 multiplies the received signals received by the respective antenna stations 41 by a weight and adds up the results. The base station signal reception processing unit 43 demodulates the added received signal (step S321). The base station signal reception processing unit 43 outputs reception waveform information obtained by decoding the demodulated received signal to the terminal signal reception processing unit 45.

The terminal signal reception processing unit 45 performs processing of receiving the terminal uplink signal indicated by the reception waveform information (step S322). Specifically, the distribution unit 451 reads waveform data having the same reception time from the reception waveform information and outputs the read waveform data to the terminal signal demodulation units 452-1 to 452-N according to antenna identifiers associated with the waveform data. Each of the terminal signal demodulation units 452-1 to 452-N identifies the wireless communication method used by the terminal station 3 to transmit the terminal uplink signal on the basis of information specific to the wireless communication method, included in received signals represented by the waveform data. The terminal signal demodulation units 452-1 to 452-N demodulate the received signals represented by the waveform data according to the identified wireless communication method and output symbols obtained by demodulation to the synthesis unit 453.

The synthesis unit 453 additively synthesizes the symbols input from each of the terminal signal demodulation units 452-1 to 452-N. According to additive synthesis, the influence of randomly added noise is reduced although signals transmitted by the terminal station 3 are emphasized because they are correlated. Therefore, the diversity effect can be obtained for terminal uplink signals simultaneously received by the mobile relay station 2*a* from only one terminal station 3. Further, the operation corresponds to MIMO communication performed on terminal uplink signals simultaneously received by the mobile relay station 2*a* from a plurality of terminal stations 3. The synthesis unit 453 outputs additively synthesized symbols to the terminal signal decoding unit 454. The terminal signal decoding unit 454 decodes the symbols additively synthesized by the synthesis unit 453 according to the identified wireless communication method to obtain terminal transmission data transmitted from the terminal station 3. The terminal signal decoding unit 454 can also use a decoding method having a large calculation load, such as SIC. The base station 4*a* repeats processing from step S321.

According to the present embodiment, the mobile relay station receives a terminal uplink signal received from a terminal station according to diversity reception, MIMO reception, or the like, as in the first embodiment. Therefore, the link budget with respect to the terminal station can be improved. Further, the mobile relay station transmits information on the reception waveform of the terminal uplink signal to a base station according to MIMO. Therefore, while the base station is included in the area in which the mobile relay station can perform communication, reception waveforms of terminal uplinks received from a large number of terminal stations by that time can be collectively transmitted with a large capacity and high quality.

Further, as described above, the mobile relay station stores and accumulates information on the reception signal waveform of a terminal uplink signal received from a terminal station without demodulating the terminal uplink signal and performs MIMO transmission at a timing at which communication with a base station is possible in the present embodiment. The base station performs processing of receiving such as demodulation/decoding on the terminal uplink signal represented by the reception signal waveform in the mobile relay station. Therefore, a non-regenerative relay method that does not depend on the communication method can be applied to a wireless communication system using a low Earth orbit satellite. Further, since non-regenerative relay is performed, the mobile relay station does not need to implement the wireless communication method used for the terminal station. For example, even if a terminal station that performs communication according to a new wireless communication method is added, it is not necessary to change the mobile relay station, and the wireless communication method may be added to a base station installed on the ground. Therefore, it is possible to simultaneously accommodate various IoT systems and it is possible to easily update the IoT systems. In addition, since a large Doppler shift applied to each terminal station can be processed by a base station instead of the mobile relay station, it is not necessary to implement a complicated non-linear operation for compensating for the Doppler shift in the mobile relay station.

Third Embodiment

In the above-described second embodiment, the base station demodulates and decodes a terminal uplink signal. In the present embodiment, a terminal uplink signal is demodulated and decoded in the mobile relay apparatus. The present embodiment will be described focusing on differences from the first and second embodiments.

Figure 6:
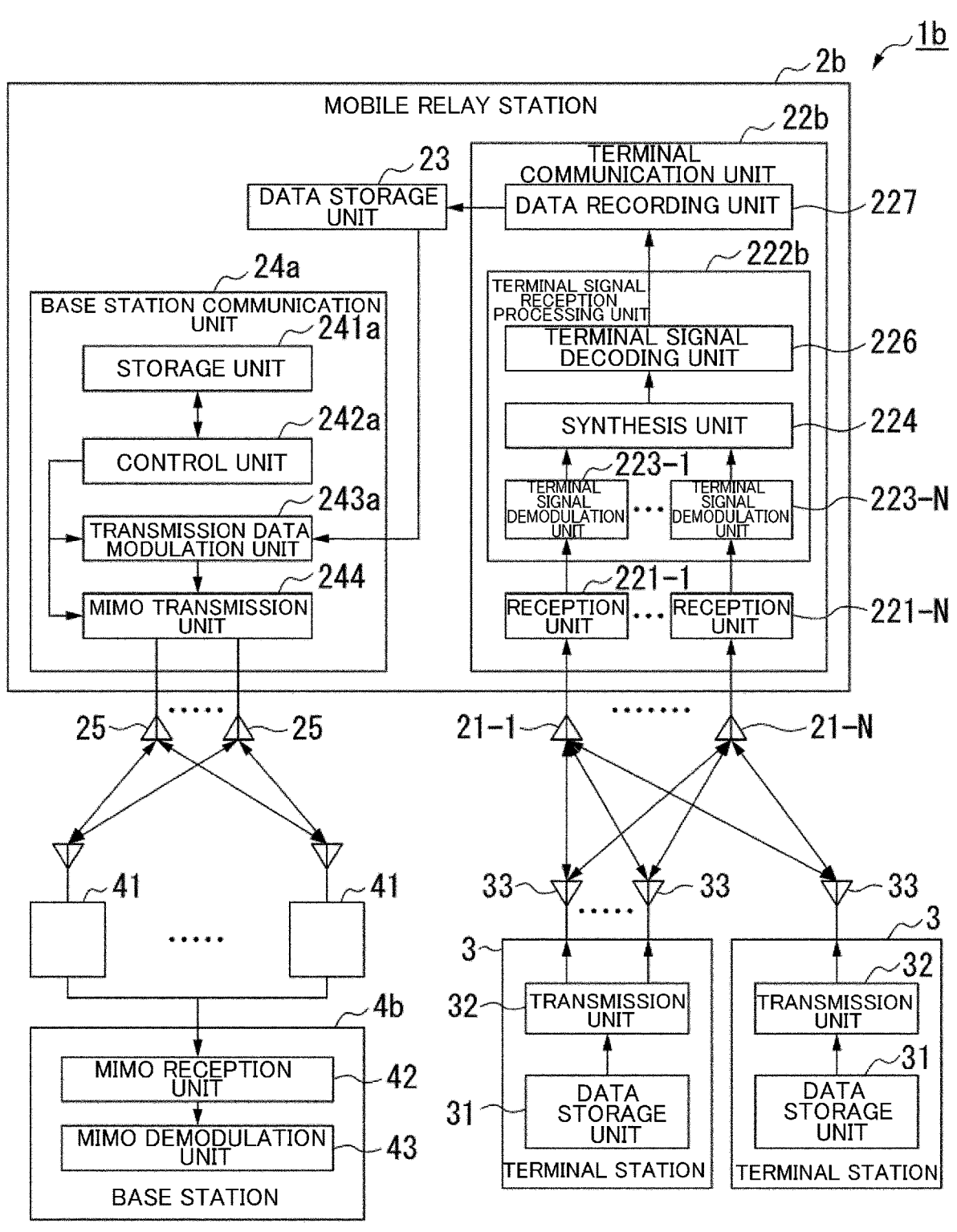
FIG. 6 is a configuration diagram of a wireless communication system according to a third embodiment.

FIG. 6 is a configuration diagram of a wireless communication system 1b according to a second embodiment. In the figure, the same components as those of the wireless communication system 1 in the first embodiment shown in FIG. 1 and the wireless communication system 1a in the second embodiment shown in FIG. 3 are designated by the same reference numerals and the description thereof will be omitted. The wireless communication system 1b includes a mobile relay station 2b, a terminal station 3, and a base station 4b.

The mobile relay station 2b includes antennas 21-1 to 21-N (N is an integer equal to or greater than 2), a terminal communication unit 22b, a data storage unit 23, a base station communication unit 24a, and a plurality of antennas 25.

The terminal communication unit 22b includes the reception units 221-1 to 221-N, a terminal signal reception processing unit 222b, and a data recording unit 227.

The terminal signal reception processing unit 222b performs processing of receiving a terminal uplink signal to obtain terminal transmission data. The terminal signal reception processing unit 222b includes N terminal signal demodulation units 223, a synthesis unit 224, and a terminal signal decoding unit 226. The synthesis unit 224 additively synthesizes symbols that are demodulation results input from the respective terminal signal demodulation units 223-1 to 223-N and outputs the symbols to the terminal signal decoding unit 226. The terminal signal decoding unit 226 decodes the additively synthesized symbols from the synthesis unit 224 to obtain terminal transmission data transmitted from the terminal station 3.

The data recording unit 227 writes the terminal transmission data decoded by the terminal signal decoding unit 226 in the data storage unit 23. The data storage unit 23 stores terminal transmission data transmitted by each terminal station 3. The transmission data modulation unit 243a of the base station communication unit 24a reads terminal transmission data as transmission data from the data storage unit 23.

The base station 4b includes a plurality of antenna stations 41, a MIMO reception unit 42, and a base station signal reception processing unit 43. The base station signal reception processing unit 43 demodulates and decodes a received signal synthesized in the MIMO reception unit 42 to obtain terminal transmission data.

The operation of the wireless communication system 1b will be described.

Figure 7:
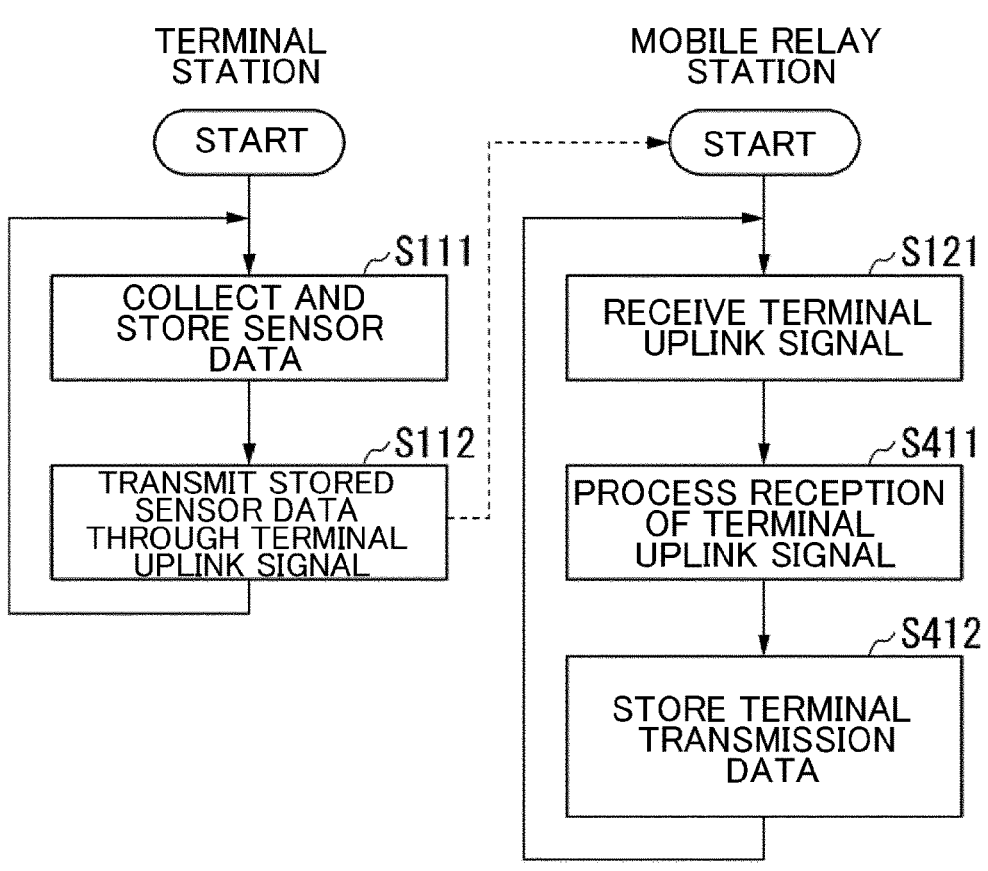
FIG. 7 is a flowchart showing processing of the wireless communication system according to the same embodiment.

FIG. 7 is a flow chart showing processing of the wireless communication system 1b when an uplink signal is transmitted from the terminal station 3. In FIG. 7, the same processing as processing shown in the flowchart of the first embodiment shown in FIG. 2 is designated by the same reference numeral.

Processing of the terminal station 3 in steps S111 to S112 is the same as that of the first embodiment shown in FIG. 2. The reception units 221-1 to 221-N of the mobile relay station 2b receive a terminal uplink signal transmitted from the terminal station 3 as in the first embodiment (step S121). The terminal signal reception processing unit 222b performs processing of receiving the terminal uplink signal received in step S121 (step S411). Specifically, the terminal signal demodulation unit 223-n identifies a wireless communication method on the basis of information specific to the wireless communication method included in the terminal uplink signal received by the reception unit 221-n. The reception units 221-1 to 221-N demodulate the terminal uplink signal according to the identified wireless communication method and output symbols obtained by demodulation to the synthesis unit 224. The synthesis unit 224 additively synthesizes the symbols input from each of the terminal signal demodulation units 223-1 to 223-N. The synthesis unit 224 outputs additively synthesized symbols to the terminal signal decoding unit 226. The terminal signal decoding unit 226 decodes the additively synthesized symbols to obtain terminal transmission data transmitted from the terminal station 3. The data recording unit 227 writes the terminal transmission data obtained by decoding the symbols by the terminal signal decoding unit 226 in the data storage unit 23 (step S412).

Figure 8:
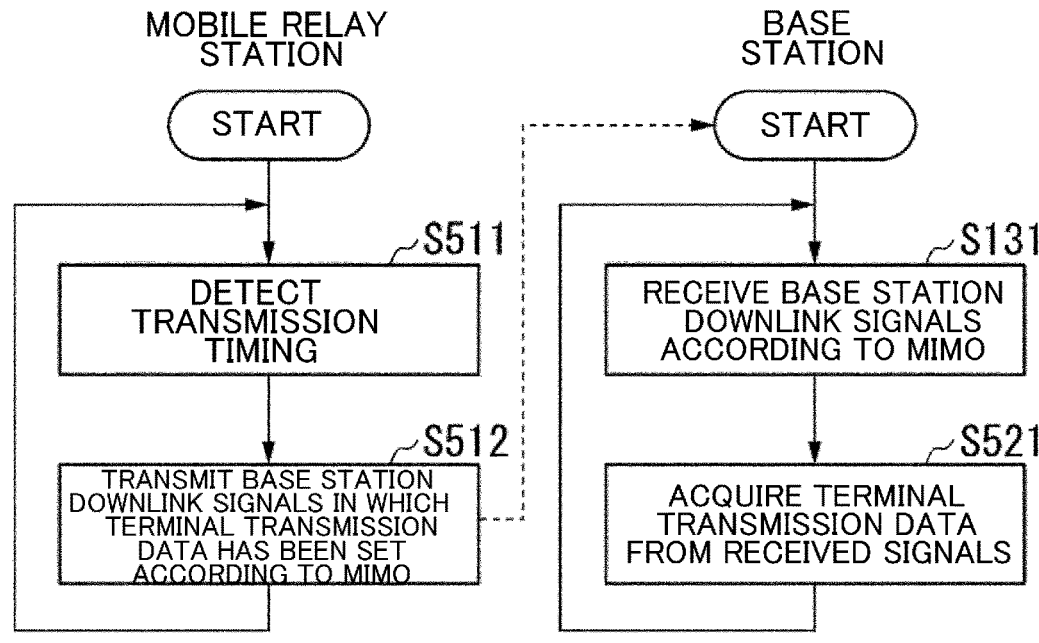
FIG. 8 is a flowchart showing processing of the wireless communication system according to the same embodiment.

FIG. 8 is a flow chart showing processing of the wireless communication system 1b when a base station downlink signal is transmitted from the mobile relay station 2b. In FIG. 8, the same processing as processing shown in the flowchart of the first embodiment shown in FIG. 2 is designated by the same reference numeral.

When the control unit 242a included in the base station communication unit 24a of the mobile relay station 2b detects arrival of a transmission start timing stored in the storage unit 241a, the control unit 242a instructs the transmission data modulation unit 243a and the MIMO transmission unit 244 to transmit terminal transmission data (step S511). The transmission data modulation unit 243a reads the terminal transmission data stored in the data storage unit 23 as transmission data, performs parallel conversion of the read transmission data, and then modulates the read data. The MIMO transmission unit 244 weights the transmission data modulated by the transmission data modulation unit 243a by a weight indicated by the control unit 242a to generate a base station downlink signal which is a transmission signal to be transmitted through each antenna 25. The MIMO transmission unit 244 transmits each generated base station downlink signal through each antenna 25 according to MIMO (step S512). The mobile relay station 2b repeats processing from step S511.

As in the first embodiment, the base station 4b receives the base station downlink signal from the mobile relay station 2b according to MIMO (step S131). That is, each antenna station 41 outputs a received signal obtained by converting the base station downlink signals received from the mobile relay station 2b into an electronic signal to the MIMO reception unit 42. The MIMO reception unit 42 synchronizes timings of received signals received from the respective antenna stations 41. The MIMO reception unit 42 multiplies the received signals received by the respective antenna stations 41 by a weight and adds up them. The base station signal reception processing unit 43 demodulates the added received signal and decodes the demodulated received signal to obtain terminal transmission data (step S521). The base station 4b repeats processing from step S131.

According to the above-described embodiments, the mobile relay station can receive a terminal uplink signal transmitted by a terminal station according to diversity reception, MIMO reception, or the like. Therefore, the mobile relay station can improve the link budget of the uplink signal from the terminal station. Further, the mobile relay station transmits data received from a terminal station to a base station according to MIMO through a plurality of antennas. Therefore, the mobile relay station can collectively transmit data collected from a plurality of terminal stations in a short time with high quality. Therefore, even when a communication area moves with the movement of the relay apparatus, data received from a communication apparatus can be relayed to another communication apparatus.

Although a case where a moving body on which the mobile relay station is mounted is a LEO satellite has been described in the above embodiments, it may be a geostationary satellite, a drone, a HAPS, or another aircraft flying over the sky.

According to the above-described embodiments, the wireless communication system includes a first communication apparatus, a second communication apparatus, and a mobile relay apparatus. For example, the first communication apparatus is the terminal station 3 in the embodiments, the second communication apparatus is the base station 4, 4a, and 4b in the embodiments, and the relay apparatus is the mobile relay station 2, 2a, and 2b in the embodiments.

The relay apparatus includes a reception unit and a transmission unit. For example, the reception unit is the terminal communication unit 22, 22a and 22b in the embodiments, and the transmission unit is the base station communication unit 24 and 24a in the embodiments. The reception unit receives data wirelessly transmitted by the first communication apparatus through a plurality of first antennas. For example, the first antennas are the antennas 21 in the embodiments. The transmission unit wirelessly transmits data received by the reception unit to the second communication apparatus through a plurality of second antennas. For example, the second antennas are the antennas 25 in the embodiments. The second communication apparatus includes a relay data reception unit. The relay data reception unit receives data wirelessly transmitted by the relay apparatus through a plurality of third antennas. The third antennas are the antenna stations 41 in the embodiments.

The relay apparatus may further include a storage unit that stores data received by the reception unit. The storage unit is the data storage unit 23 in the embodiments. The transmission unit wirelessly transmits data stored in the storage unit through the second antennas at a timing at which communication with the second communication apparatus is possible.

Further, the reception unit may receive a first wireless signal in which data has been set through the plurality of first antennas. For example, the first signal is a terminal uplink signal in the embodiments. The storage unit stores waveform data representing the waveform of the first signal received through each of the plurality of first antennas. The transmission unit wirelessly transmits a second signal representing waveform data stored in the storage unit through the plurality of second antennas. For example, the second signal is a base station downlink signal in the embodiments. The relay data reception unit includes a second signal reception unit, a second signal reception processing unit, and a first signal reception processing unit. The second signal reception unit receives the second signal wirelessly transmitted by the relay apparatus through the plurality of third antennas. The second signal reception processing unit synthesizes the second signal received by the first signal reception unit through each of the plurality of third antennas and performs processing of receiving the synthesized second signal to acquire waveform data corresponding to each of the plurality of first antennas. The first signal reception processing unit demodulates the first signal represented by the waveform data acquired by the second signal reception processing unit and decodes a signal obtained by synthesizing demodulation results with respect to the plurality of first antennas to acquire data set in the first signal by the first communication apparatus. For example, the second signal reception unit is the antenna station 41 and the MIMO reception unit 42 in the embodiments, the second signal reception processing unit is the base station signal reception processing unit 43 in the embodiments, and the first signal reception processing unit is the terminal signal reception processing unit 45. Meanwhile, the first signal processing unit can perform processing of receiving according to a plurality of wireless methods.

The reception unit may receive the first wireless signal in which data has been set from the first communication apparatus through the plurality of first antennas and perform processing of receiving the received first signal to acquire the data. The transmission unit wirelessly transmits the second signal in which data stored in the storage unit has been set through the plurality of second antennas. The relay data reception unit includes the second signal reception unit and the second signal reception processing unit. The second signal reception unit receives the second signal wirelessly transmitted by the relay apparatus through the plurality of third antennas. The second signal reception processing unit synthesizes the second signal received by the first signal reception unit through each of the plurality of third antennas and performs processing of receiving the synthesized second signal to acquire the data set in the first signal by the first communication apparatus.

Although the embodiments of the present invention have been described in detail with reference to the drawings, specific configurations are not limited to these embodiments, and designs and the like within a range that does not deviating from the gist of the present invention are also included.

REFERENCE SIGNS LIST

1, 1a, 1b Wireless communication system
2, 2a, 2b Mobile relay station
3 Terminal station
4, 4a, 4b Base station
21-1 to 21-N Antenna
22, 22a, 22b Terminal communication unit
23 Data storage unit
24, 24a Base station communication unit

25 Antenna
31 Data storage unit
32 Transmission unit
33 Antenna
41 Antenna station
42 MIMO reception unit
43 Base station signal reception processing unit
44, 45, 222, 222*b* Terminal signal reception processing unit
221-1 to 221-N Reception unit
223-1 to 223-N, 452-1 to 452-N Terminal signal demodulation unit
224, 453 Synthesis unit
225-1 to 225-N Reception waveform recording unit
226, 441, 454 Terminal signal decoding unit
227 Data recording unit
241, 241*a* Storage unit
242, 242*a* Control unit
243, 243*a* Transmission data modulation unit
244 MIMO transmission unit
451 Distribution unit

The invention claimed is:

1. A wireless communication system comprising a first communication apparatus, a second communication apparatus, and a mobile relay apparatus, wherein
the relay apparatus comprises;
a plurality of first antennas;
a plurality of second antennas;
a receiver that receives data wirelessly transmitted by the first communication apparatus through the plurality of first antennas;
a storage that stores the data received by the receiver; and
a transmitter that wirelessly transmits the data stored by the storage to the second communication apparatus through the plurality of second antennas, and
the second communication apparatus comprises;
a plurality of third antennas; and
a relay data receiver that receives the data wirelessly transmitted by the relay apparatus through the plurality of third antennas;
wherein the receiver receives a first wireless signal in which the data has been set through the plurality of first antennas,
the storage stores, in association,
waveform data representing a waveform of the first signal received through each of the plurality of first antennas,
a reception time of the first signal, and
an antenna identifier of a first antenna, among the plurality of first antennas, which received the first signal, and
the transmitter wirelessly transmits a second signal representing the waveform data, the reception time and the antenna identifier stored in the storage through the plurality of the second antennas, and
the relay data receiver comprises:
a second signal receiver that receives the second signal wirelessly transmitted by the relay apparatus through the plurality of third antennas;
a second signal reception processor that synthesizes the second signal received by the second signal receiver through each of the plurality of third antennas and performs processing of receiving the synthesized second signal to acquire the waveform data corresponding to each of the plurality of first antennas; and
a first signal reception processor that demodulates the first signal represented by the waveform data acquired by the second signal reception processor with respect to each of the plurality of first antennas and decodes a signal obtained by synthesizing demodulation results with respect to the plurality of first antennas to acquire the data.

2. The wireless communication system according to claim 1, wherein
the transmitter wirelessly transmits the data stored in the storage through the second antennas at a timing when communication with the plurality of second communication apparatus is possible.

3. The wireless communication system according to claim 1, wherein
the first signal reception processor performs the processing of receiving by a plurality of wireless methods.

4. The wireless communication system according to claim 1, wherein
the relay apparatus is provided in an air vehicle flying over the sky, and
the first communication apparatus and the second communication apparatus are installed on the Earth.

5. The wireless communication system according to claim 4, wherein
the air vehicle is a low Earth orbit satellite.

6. The wireless communication system according to claim 1,
wherein the storage stores the waveform data representing the waveform of the first signal without demodulating the first signal received through each of the plurality of first antennas.

7. The wireless communication system according to claim 1,
wherein the storage stores in advance a weight for each transmission time of the data transmitted through the plurality of second antennas, and
wherein the transmitter weights the data stored in the storage by the weight stored in the storage, and transmits the weighted data to the second communication apparatus through the plurality of second antennas.

8. The wireless communication system according to claim 1, wherein
the transmitter collectively transmits, to the second communication apparatus through the plurality of second antennas, the second signal regarding the first signal received so far from the first communication apparatus while the second communication apparatus is included in an area in which the relay apparatus can perform communication.

9. A relay apparatus in a wireless communication system including a first communication apparatus, a second communication apparatus, and the mobile relay apparatus,
the relay apparatus comprising:
a plurality of first antennas;
a plurality of second antennas;
a receiver that receives data wirelessly transmitted by the first communication apparatus through the plurality of first antennas;
a storage that stores the data received by the receiver, and
a transmitter that wirelessly transmits the data stored by the storage to the second communication apparatus, which receives the data using a plurality of third antennas, through the plurality of second antennas,
wherein the receiver receives a first wireless signal in which the data has been set through the plurality of first antennas,
the storage stores, in association,

waveform data representing a waveform of the first signal received through each of the plurality of first antennas, a reception time of the first signal, and an antenna identifier of a first antenna, among the plurality of first antennas, which received the first signal, and the transmitter wirelessly transmits a second signal representing the waveform data, the reception time and the antenna identifier stored in the storage through the plurality of the second antennas.

10. A wireless communication method executed by a relay apparatus in a wireless communication system including a first communication apparatus, a second communication apparatus, and the mobile relay apparatus, the wireless communication method comprising:

receiving data wirelessly transmitted by the first communication apparatus through a plurality of first antennas comprised in the relay apparatus;

storing, in a storage of the relay apparatus, the received data; and

wirelessly transmitting the stored data to the second communication apparatus, which receives the data using a plurality of third antennas comprised in the second communication apparatus, through a plurality of second antennas comprised in the relay apparatus, wherein, in the receiving of the data, the relay apparatus receives a first wireless signal in which the data has been set through the plurality of first antennas, wherein, in the storing of the received data, the relay apparatus makes the storage store waveform data representing a waveform of the first signal received through each of the plurality of first antennas, a reception time of the first signal, and an antenna identifier of a first antenna, among the plurality of first antennas, which received the first signal, wherein, in the transmitting of the stored data, the relay apparatus wirelessly transmits a second signal representing the waveform data, the reception time and the antenna identifier stored in the storage through the plurality of the second antennas.

* * * * *